United States Patent
Akasaka (10) Patent No.: US 9,234,988 B2
(45) Date of Patent: Jan. 12, 2016

(54) FABRICATION METHOD FOR MICROLENS ARRAY SUBSTRATE

(71) Applicant: Seiko Epson Corporation, Tokyo (JP)

(72) Inventor: Koichiro Akasaka, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/044,691

(22) Filed: Oct. 2, 2013

(65) Prior Publication Data

US 2014/0116986 A1  May 1, 2014

(30) Foreign Application Priority Data

Oct. 29, 2012  (JP) .................................. 2012-237561

(51) Int. Cl.
*G02B 3/00* (2006.01)
*B29D 11/00* (2006.01)
*G02F 1/1335* (2006.01)

(52) U.S. Cl.
CPC ........ *G02B 3/0012* (2013.01); *B29D 11/00019* (2013.01); *G02B 3/0075* (2013.01); *G02F 1/133526* (2013.01)

(58) Field of Classification Search
None
See application file for complete search history.

(56) References Cited

U.S. PATENT DOCUMENTS

| 6,366,406 B1* | 4/2002 | Hamanaka et al. ........... 359/619 |
| 7,064,901 B2 | 6/2006 | Ozawa |
| 2004/0146807 A1* | 7/2004 | Lee et al. ....................... 430/311 |
| 2004/0246587 A1* | 12/2004 | Ozawa ........................... 359/618 |
| 2005/0141085 A1* | 6/2005 | Shimizu et al. ................ 359/443 |
| 2013/0170047 A1* | 7/2013 | Weng et al. .................... 359/653 |

FOREIGN PATENT DOCUMENTS

| JP | 04-050920 A | 2/1992 |
| JP | 07-168167 A | 7/1995 |
| JP | 11-015378 A | 1/1999 |
| JP | 2004-070283 A | 3/2004 |
| JP | 2005-208106 A | 8/2005 |
| JP | 2006-114847 A | 4/2006 |
| JP | 2009-006521 A | 1/2009 |

* cited by examiner

*Primary Examiner* — Shamim Ahmed
*Assistant Examiner* — Bradford Gates
(74) *Attorney, Agent, or Firm* — ALG Intellectual Property, LLC (57) ABSTRACT

A microlens substrate will warp when an oxide film is formed and annealed before forming a mask in order to adjust the etching rate of wet etching. Accordingly, a film exerting a stress that cancels out this warping is formed upon a microlens. This film functions as an optical path length adjusting layer.

5 Claims, 10 Drawing Sheets

FABRICATION METHOD FOR MICROLENS ARRAY SUBSTRATE

BACKGROUND

1. Technical Field

The present invention relates to fabrication methods for microlens array substrates.

2. Related Art

Various types of electronic elements, including various types of wires such as data lines, scanning lines, and capacitance lines as well as thin-film transistors ("TFTs" hereinafter) are built into image display regions of electro-optical apparatuses such as liquid-crystal apparatuses. Accordingly, of the total amount of parallel light incident upon such an electro-optical apparatus, it is only possible to utilize an amount of light allowed by the numerical aperture of the pixels, unless some kind of measures are taken.

As one such measure, a microlens array containing microlenses corresponding to respective pixels has in the past been embedded into an opposing substrate, a microlens array substrate has been affixed to an opposing substrate, and so on. Doing so takes light that originally travels toward non-aperture regions outside the aperture regions of the respective pixels and focuses the light on a pixel-by-pixel basis so as to conduct the light to the aperture regions of the pixels. The electro-optical apparatus can produce a bright display as a result.

A high lens efficiency is a basic requirement in such microlenses. As such, methods for fabricating microlenses having aspheric surfaces have been proposed.

For example, JP-A-2004-70283 discloses a method for fabricating a microlens that includes forming on a substrate a first film that has an etching rate higher than the substrate, forming on the first film a mask in which a hole is provided at a position corresponding to a center of the microlens to be formed, and forming in the substrate an aspheric recess that defines a curved surface of the microlens by wet-etching the first film over the mask.

According to JP-A-2004-70283, after being formed on the substrate, the first film is subjected to annealing at a predetermined temperature so as to bake the first film and control the etching rate thereof. However, the inventors of this invention discovered that the annealing in this method causes the substrate to warp, causing problems in the subsequent steps of forming films and the like. A large warp in the substrate makes it difficult to position the element substrate and the opposing substrate when affixing the substrates to each other, making it generally difficult to affix the element substrate and the opposing substrate to each other. A large warp in the substrate can also make it impossible to carry out vacuum suction during the substrate transportation, resulting in errors, and can furthermore result in localized forces being applied when polishing the substrate surface during a smoothing process, which can cause the film to peel off.

SUMMARY

An advantage of some aspects of the invention is to provide a fabrication method for a microlens array capable of suppressing warps from arising in a substrate.

In order to achieve the stated advantage, the invention employs the following methods.

1. A fabrication method for a microlens array according to one aspect of the invention includes: forming an oxide film on a substrate; annealing the substrate on which the oxide film has been formed; forming, on the oxide film, a mask having an opening in a location corresponding to the center of a microlens that is to be formed; forming an aspheric surfaced recess having tapered edges in the substrate on which the oxide film has been formed by wet-etching the oxide film and the substrate over the mask; forming the microlens by depositing a material having a higher refractive index than the substrate in the recess; and forming an optical path length adjusting layer on the microlens. Here, the step of forming the optical path length adjusting layer includes depositing a first film that receives compressive stress in a direction orthogonal to a normal direction of the substrate and a second film that receives tensile stress in the direction orthogonal to the normal direction of the substrate; and in the step of forming the optical path length adjusting layer includes forming a film that exerts a stress that warps the substrate in a direction that cancels out warping produced in the substrate by the annealing and is selected from among the first film and the second film, and the film that has been selected is formed on the microlens first.

According to this method, a film that exerts a stress that warps the substrate in a direction that cancels out the warping produced in the substrate by the annealing is formed on the microlens at the beginning of the step of forming the optical path length adjusting layer, and thus the stress produced in the substrate by the annealing can be greatly alleviated in the initial stage of forming the optical path length adjusting layer.

For example, in the case where a film that exerts a stress that warps the substrate in the opposite direction as the direction that cancels out the warping produced in the substrate by the annealing is formed on the microlens first, that film will cause the substrate to warp in a direction that increases the warping produced in the substrate by the annealing. As a result, the substrate warps extensively in the initial stage of forming the optical path length adjusting layer, which makes it difficult to correct the warping in the substrate later. However, in the method according to this aspect of the invention, the film that exerts a stress that warps the substrate in a direction that cancels out the warping produced in the substrate by the annealing is formed on the microlens first, and thus the stated problem does not occur.

In addition, because the first film and the second film are layered in an alternating manner, the warping in the substrate can be corrected while adjusting the amount of stress to be alleviated in the substrate by adjusting formation conditions such as the thicknesses, materials, and so on of the first film and the second film.

Accordingly, the substrate can be suppressed from warping.

2. In the fabrication method for the microlens array according to 1 above, the substrate may be a silica substrate and the oxide film may be a silicon oxide film; and in the step of forming the optical path length adjusting layer, the first film may be selected as the film that is formed on the microlens first.

3. In the fabrication method for the microlens array according to 2 above, the annealing may be performed at no less than 800° C. and no more than 1100° C.

4. In the fabrication method for the microlens array according to any one of 1 to 3 above, in the step of forming the optical path length adjusting layer, the substrate may be caused to warp in a direction that cancels out warping in the substrate caused by a later step performed after the step of forming the optical path length adjusting layer.

According to this method, the substrate can, in the step of forming the optical path length adjusting layer, be pre-warped in a direction that alleviates stress produced in the substrate in a later step. Accordingly, the microlens array substrate that is ultimately fabricated can be prevented from warping.

5. In the fabrication method for the microlens array according to 4 above, the later step may be a step of forming a light-blocking film on the optical path length adjusting layer; and in the step of forming the optical path length adjusting layer, the substrate may be caused to warp in a direction that cancels out warping in substrate caused by the step of forming the light-blocking film.

According to this method, the substrate can, in the step of forming the optical path length adjusting layer, be pre-warped in a direction that alleviates stress produced in the substrate in the step of forming the light-blocking film.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described in detail with reference to the drawings. It should be noted that in the appended drawings, the scale of the various constituent elements has been changed as appropriate to make the constituent elements more visibly recognizable.
Microlens Array Substrate First, a microlens array substrate that can be fabricated through the microlens array substrate fabrication method according to the invention will be described with reference to FIGS. 1 and 2.

Figure 1:
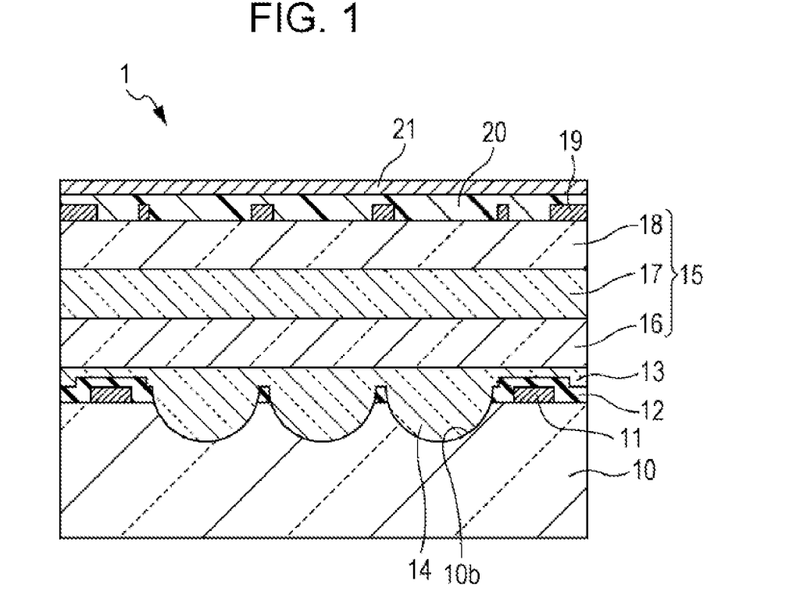
FIG. 1 is a cross-sectional view of a microlens array substrate according to an embodiment of the invention.

FIG. 1 is a cross-sectional view of a microlens array substrate 1 according to an embodiment of the invention.

Figure 2:
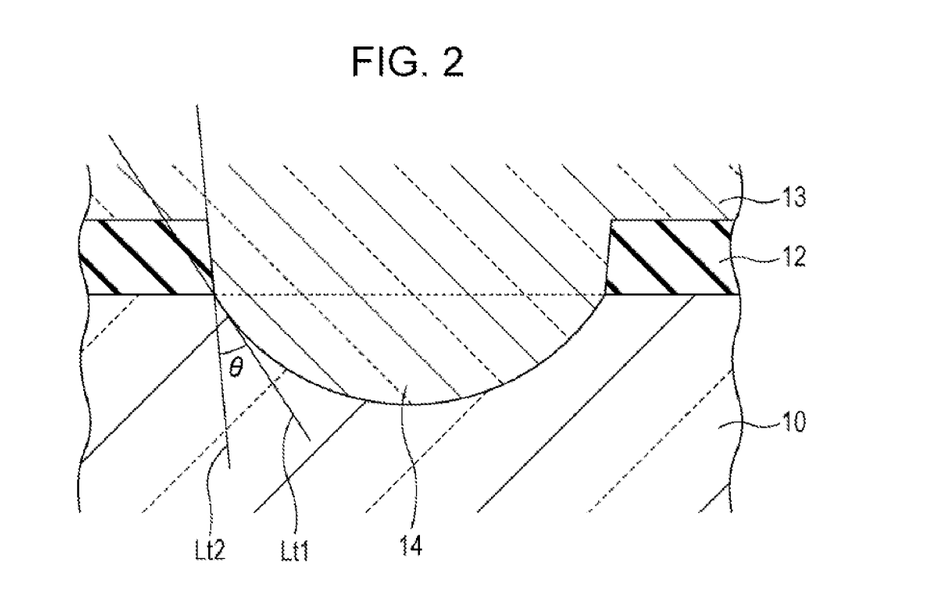
FIG. 2 is a cross-sectional partial enlargement of the microlens array substrate.

FIG. 2 is a cross-sectional partial enlargement of the microlens array substrate 1 (that is, an enlarged cross-sectional view of a microlens 14).

As shown in FIG. 1, the microlens array substrate 1 according to this embodiment is fabricated by forming a lens layer 13 configured of the plurality of microlenses 14 by depositing a lens material on a substrate 10 in which is formed a plurality of recesses 10b corresponding to the plurality of microlenses 14 so as to form the plurality of microlenses 14, forming an optical path length adjusting layer 15 upon the lens layer 13, and furthermore forming a light-blocking film 19, a flattening film 20, and a transparent conductive film 21 in that order upon the optical path length adjusting layer 15.

Note that in the following descriptions, the substrate will be referred to as a "substrate main body" prior to the recesses 10b being formed, and will be referred to simply as a "substrate" after the recesses 10b have been formed.

The plurality of recesses 10b are formed in the substrate 10 in a matrix. A transparent plate member configured of, for example, a silica substrate or the like is used as the substrate main body.

The microlenses 14 are formed of a highly transmissible (that is, highly light-transmissible) material that has a higher refractive index than the substrate 10.

The curved surfaces of the microlenses 14 are generally defined by the substrate 10 and the lens layer 13, which have different refractive indexes. Each microlens 14 is constructed as a convex lens that protrudes downward in a convex shape.

In this embodiment, the microlens array is fabricated using a fabrication method that will be described later, and thus a film 12 (an oxide film) remains on a top surface of the substrate 10 near the edges of the microlenses 14 and in regions where the microlenses 14 are not formed. The film 12 is configured of, for example, a transparent silicon oxide film ($SiO_2$).

The optical path length adjusting layer 15 is formed of a highly transmissible (that is, highly light-transmissible) material such as $SiO_2$. The refractive index of the optical path length adjusting layer 15 is approximately the same as that of the substrate 10, for example.

The optical path length adjusting layer 15 is configured by forming a first film 16, a second film 17, and a third film 18 in that order upon the lens layer 13. The first film 16, the second film 17, and the third film 18 will be described in detail later.

The microlens array substrate 1 is disposed so that during use, the microlenses 14 correspond to respective pixels in, for example, an electro-optical apparatus such as a liquid-crystal apparatus. Accordingly, due to the refraction effects of the microlenses 14 and the adjustment effect of the optical path length adjusting layer 15, light incident near the center of the microlenses 14 is focused toward the centers of the corresponding pixels in the electro-optical apparatus.

The light-blocking film 19 defines the non-aperture regions in the electro-optical apparatus to which the microlens array substrate 1 is attached. Specifically, the light-blocking film 19 employs a grid-shaped planar pattern so as to define individual non-aperture regions in grid form. Note that the light-blocking film 19 may instead have a stripe-shaped planar pattern and may be used along with another light-blocking film to define the non-aperture regions in grid form.

Through this, the non-aperture regions for each pixel can be defined with more certainty, and light leakage and the like between the respective pixels can be suppressed. Furthermore, light can be prevented from being incident on electronic elements that are built into the non-aperture regions of the electro-optical apparatus, such as TFTs, whose characteristics change when photo-leakage current is produced under photoelectric effects occurring when light is incident thereon.

Note that as shown in FIG. 1, the flattening film 20 is formed covering the light-blocking film 19 on the optical path length adjusting layer 15, and the transparent conductive film 21 is formed upon the flattening film 20. Furthermore, an orientation layer may be formed upon the transparent conductive film 21. In addition, in the microlens array substrate 1, R (red), G (green), or B (blue) color filters may be built into the aperture regions of the pixels defined by the light-blocking film 19.

As shown in FIG. 2, edge areas of the microlenses 14 are formed from the film 12, which has a different etching rate from the substrate 10. The edge areas of the microlenses 14 have steeper pitches than that of the curved surfaces in the microlenses 14 of the substrate 10.

The curved lens surfaces of the microlenses 14 are aspheric surfaces having tapers at the side edges thereof. Specifically, the curved lens surfaces of the microlenses 14 in the substrate 10 are aspheric surfaces having shallower bases than spherical surfaces, or in other words, have semi-elliptical shapes when viewed along a cross-section. The curved lens surfaces of the microlenses 14 in the film 12 are steeper-pitched surfaces than the shallow-based aspheric surfaces, or in other words, follow straight lines when viewed along a cross-section. Accordingly, in each microlens 14, the curvature radius near the center thereof is greater than the curvature radius in a spherical lens.

The lens efficiency is improved depending on the degree of the aspheric surface. That is, unlike a spherical lens whose aperture diameter and lens depth are the same, a lens having a curved surface only near the center thereof, as in this embodiment, can have a larger curved surface (that is, a smaller curvature radius), which makes it possible to reduce the focal length.

Furthermore, spherical aberration can be reduced and the focal point can be kept constant, as compared to when a spherical lens is employed.

In FIG. 2, reference numeral Lt1 indicates a line tangent at an area in the substrate 10 where the curved lens surface of the microlens 14 is sloped the most, or in other words, at the upper edge of the curved lens surface of the microlens 14 in the substrate 10. A reference numeral Lt2 indicates a line tangent at an area in the film 12 where the curved lens surface of the microlens 14 is sloped the most, or in other words, at the upper edge of the curved lens surface of the microlens 14 in the film 12. An angle θ is an angle formed by the line tangent Lt1 and the line tangent Lt2.

In this embodiment, the curved lens surfaces of the microlenses 14 are defined so that the angle θ is 30° to 50°, for example. Note that the angle θ can be controlled, depending on the light source and the projection-side lens design, from an angle that provides a gentle slope in the curved lens surface to an angle that provides a steep slope in the curved lens surface.

Furthermore, setting the angle θ as desired based on the specifications of the electro-optical apparatus makes it possible to ensure that light focused through the edges of the microlenses 14 in addition to the vicinity of the centers thereof can pass through the aperture regions of the corresponding pixels.

According to this configuration, incident light such as projected light incident from below the substrate in FIG. 2 can, due to the light-focusing effects of the microlenses 14, be efficiently utilized as display light. This makes it possible to achieve a bright and clear image display.

Fabrication Method for Microlens Array Substrate

Next, a fabrication method for the microlens array substrate 1 according to this embodiment of the invention will be described with reference to FIGS. 3A through 9.

FIGS. 3A through 8C are schematic diagrams illustrating steps for fabricating the microlens array substrate 1 and warping in the substrate.

Figure 9:
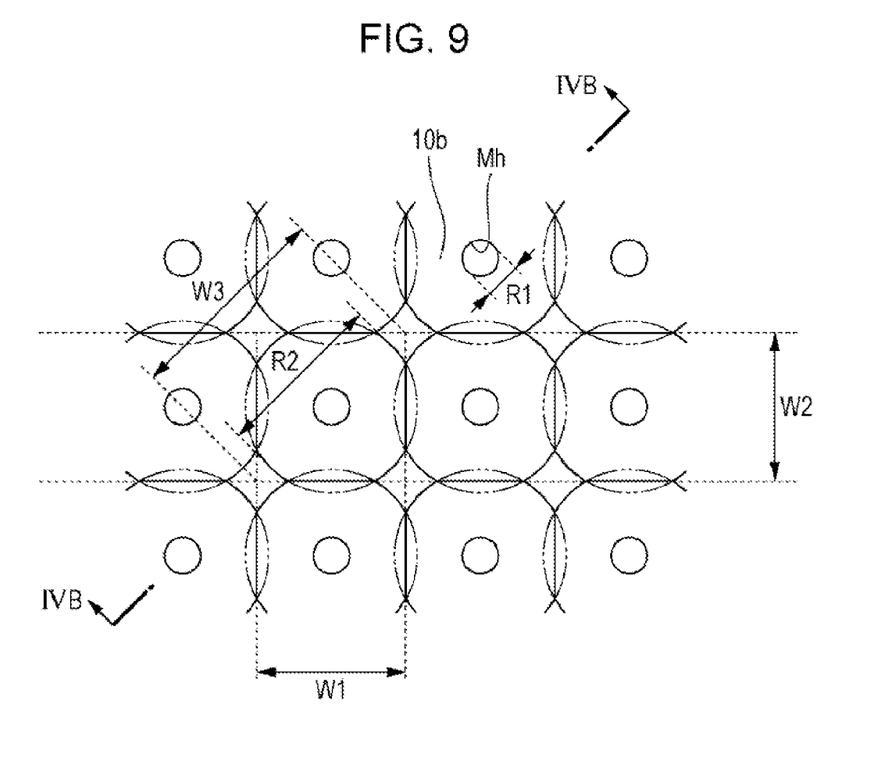
FIG. 9 is a plan view illustrating a positional relationship between a substrate and a mask.

FIG. 9 is a plan view illustrating a positional relationship between the substrate 10 and a mask M.

Note that in FIGS. 3A through 8C, the left sides are diagrams illustrating steps for fabricating the microlens array substrate 1 as cross-sectional views, and the right sides indicate the state of warping in the substrate.

Furthermore, for the sake of simplicity, "warping in the substrate" may refer not only to warping in the substrate 10 but also to warping in the substrate main body 10a in the following descriptions.

"Warping amount" refers to the distance from the center of the substrate to the area of the substrate that is the most warped (that is, an end edge of the substrate) in a normal direction of the substrate (that is, the thickness direction of the substrate when the substrate is not warped). Here, the warping amount is a value obtained by adding the distance from the center of the substrate to the left end edge of the substrate in the normal direction of the substrate to the distance from the center of the substrate to the right end edge of the substrate in the normal direction of the substrate and dividing the result by 2, or in other words, is the mean value of right and left warping amounts.

Although there are cases where the warping of the substrate is concave (that is, protrudes downward) and cases where the warping of the substrate is convex (that is, protrudes upward), the warping amount is an absolute value.

First, as indicated on the left side of FIG. 3A, a film 11a configured of amorphous silicon (α-Si) is formed on the substrate main body 10a through, for example, chemical vapor deposition ("CVD" hereinafter), sputtering, or the like. A disc-shaped transparent plate member configured of silica or the like is used as the substrate main body 10a. The substrate main body 10a is, for example, approximately 200 mm in diameter and 1.2 mm thick.

Figure 3A:
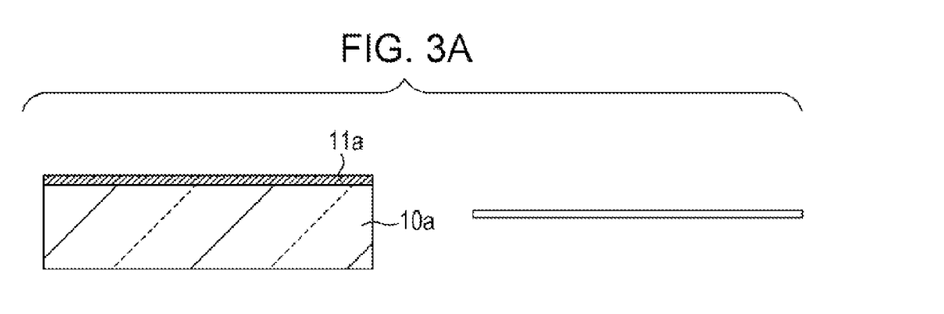
FIGS. 3A through 3C are schematic diagrams illustrating steps for fabricating a microlens array substrate and warping in the substrate.

The substrate is not warped in this step, as indicated in the right side of FIG. 3A.

Figure 3B:
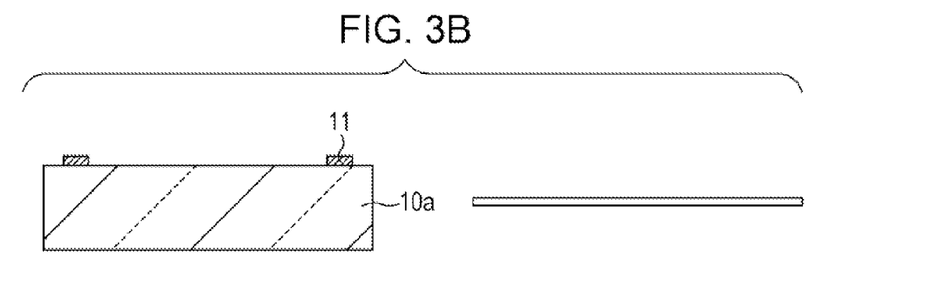

Next, as indicated on the left side in FIG. 3B, the film 11a is removed from regions aside from areas corresponding to marks 11 that are to be formed, by patterning the film 11a using photolithography and etching. This forms the marks 11, which function as alignment marks for excavating openings Mh in locations of a mask Ma (mentioned later) that correspond to the centers of the microlenses to be formed.

The substrate is not warped in this step, as indicated in the right side of FIG. 3B.

Figure 3C:
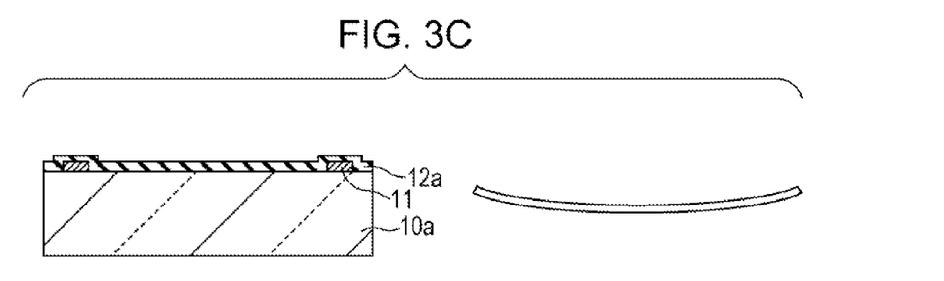

Next, as indicated in the left side of FIG. 3C, a film (oxide film) 12a, whose etching rate under a predetermined type of etchant such as a hydrofluoric acid is higher than the etching rate of the substrate main body 10a, is formed so as to cover the film 11a on the substrate main body 10a. The film 12a is formed from a transparent silicon oxide film or the like, through CVD, sputtering, or the like. The film 12a is, for example, no less than 400 Å and no more than 600 Å thick. In this embodiment, the film 12a is approximately 500 Å thick.

After this, the substrate main body 10a on which the film 12a is formed is subjected to annealing in, for example, a nitrogen gas ($N_2$ gas) atmosphere at no less than 800° C. and no more than 1100° C. This determines the etching rate of the film 12a.

The substrate is warped in a concave shape (that is, protrudes downward) in this step, as indicated in the right side of FIG. 3C. The warping amount at this time is approximately 20 μm. The substrate main body 10a experiencing thermal deformation due to the annealing can be thought of as a reason for the substrate warping in this manner. The warping can also be thought to be caused by the substrate main body 10a being supported on both ends and sagging under its own weight.

Figure 4A:
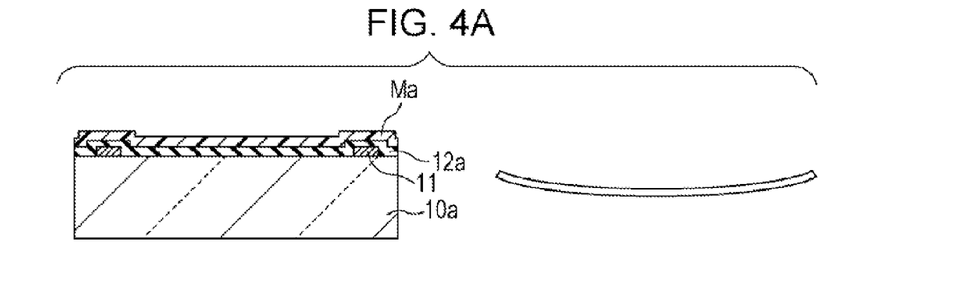
FIGS. 4A through 4C are schematic diagrams illustrating steps for fabricating a microlens array substrate and warping in the substrate.

Next, as indicated in the left side of FIG. 4A, the mask Ma, configured of a polysilicon film, is formed upon the film 12a through CVD, sputtering, or the like.

The substrate remains warped in a concave shape (that is, protrudes downward) in this step, as indicated in the right side of FIG. 4A. In other words, the warping amount at this time is approximately 20 µm.

Figure 4B:
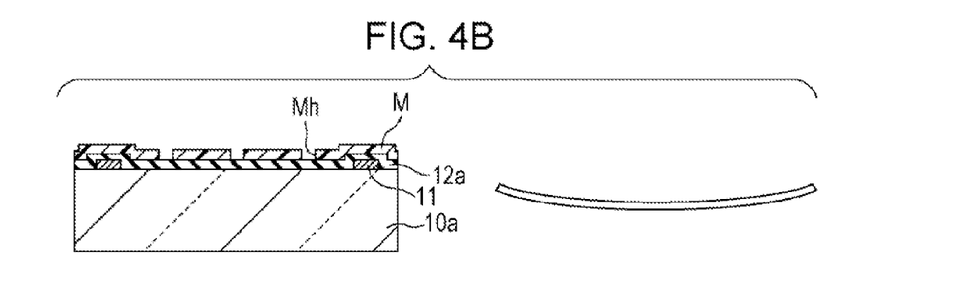

Next, as indicated on the left side in FIG. 4B, the openings Mh are excavated in locations corresponding to the centers of the microlenses to be formed, by patterning over the mask Ma using photolithography and etching. At this time, the positions of the openings Mh are determined based on the positions of the marks 11. This forms the mask M, which has the openings Mh in the locations that correspond to the centers of the microlenses to be formed. Note that the left side in FIG. 4B corresponds to a cross-sectional view taken along the IVB-IVB line shown in FIG. 9.

As shown in FIG. 9, diameters R1 of the openings Mh are smaller than diameters R2 of the recesses 10b (that is, the diameters of the microlenses 14 to be formed). In FIG. 9, reference numeral W1 indicates a first width of a single pixel that is rectangular in shape when viewed from above; reference numeral W2 indicates a second width that is orthogonal to the first width, and reference numeral W3 indicates a third width taken along the diagonal direction of the pixels. For example, the first width W1 and the second width W2 are each 4 µm to 30 µm. Furthermore, the sizes of the diameters R1 of the openings Mh are greater than 1 µm but are shorter than approximately 80% the length of the third width W3. Likewise, the sizes of the diameters R2 of the recesses 10b are greater than the diameters R1 of the openings Mh but are shorter than approximately 95% the length of the third width W3.

The substrate remains warped in a concave shape (that is, protrudes downward) in this step, as indicated in the right side of FIG. 4B. In other words, the warping amount at this time is approximately 20 µm.

Figure 4C:
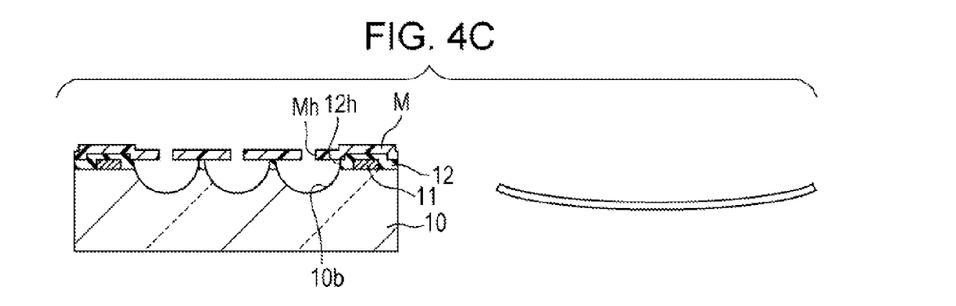

Next, as indicated in the left side of FIG. 4C, the film 12a and the substrate main body 10a are wet-etched over the mask M using a hydrofluoric acid-type etchant. Because the etching rate of the etchant on the film 12a is higher than the etching rate on the substrate main body 10a, the film 12a is etched at a higher rate.

In other words, spherical surfaced recesses are excavated in the film 12a in the periphery of the openings Mh in the mask M during a period leading up to openings 12h being etched in the film 12a, but the film 12a is then etched more quickly after the openings 12h have been formed in the film 12a. Accordingly, the etching spreads outward from the openings Mh faster than in the depth direction. In other words, there is a relatively higher amount of side-etching. Through this, the aspheric surfaced recesses 10b having tapered side edges are excavated in the substrate main body 10a on which the film 12a has been formed. Specifically, the recesses 10b having bases that are shallower than spherical surfaces are excavated in the substrate main body 10a.

After this, time is managed so that the etching stops at a stage where the recesses 10b have been excavated to sizes corresponding to the microlenses 14. In other words, the substrate 10, in which the shallow-base recesses 10b have been excavated on a microlens-by-microlens basis, is completed.

Although the substrate remains warped in a concave shape (that is, protrudes downward) in this step, as indicated in the right side of FIG. 4C, the amount of warping in the substrate changes slightly as a result of the wet etching. The warping amount at this time is approximately 25 µm.

In this embodiment, the etching rate is controlled by setting at least one of the following conditions: the type of the film 12a, such as the material, density, and porosity thereof; the technique used to form the film 12a, such as CVD, sputtering, or the like; the temperature at which the film 12a is formed, such as no more than 400° C. or no less than 400° C. and no more than 1000° C.; and the processing temperatures employed during the heat treatment or annealing after the film 12a has been formed.

For example, of CVD and sputtering, sputtering results in a finer film 12a, which makes it possible to reduce the etching rate. Likewise, during the heat treatment following the formation of the film 12a, increasing the processing temperature results in a finer film 12a, which makes it possible to reduce the etching rate, whereas reducing the processing temperature makes it possible to increase the etching rate. Controlling the etching rate in this manner makes it comparatively easy to adjust the curvature factors or the curvature factor distribution among the aspheric surfaces defined by the recesses 10b that are ultimately obtained.

Note that the curvature factors or the curvature factor distribution among the aspheric surfaces defined by the recesses 10b that are ultimately obtained can also be adjusted comparatively easily based on the thickness of the film 12a.

The various conditions for controlling the etching rate, the thickness of the film 12a, and so on may be set on an individual basis experimentally, experientially, or theoretically, or may be set specifically based on the sizes of the microlenses 14 that are actually used and the capabilities, apparatus specifications, and so on required of the microlenses 14.

Figure 5A:
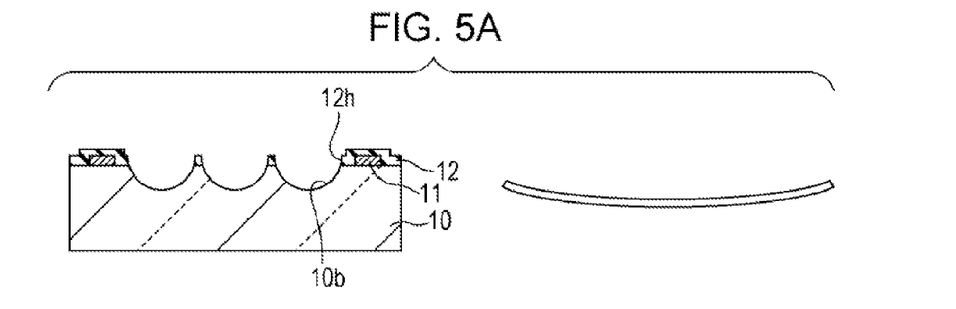
FIGS. 5A through 5C are schematic diagrams illustrating steps for fabricating a microlens array substrate and warping in the substrate.

Next, as indicated in the left side of FIG. 5A, the mask M is removed through an etching process. Note that this step (the step indicated in the left side of FIG. 5A) can be omitted if the thickness of the mask M can be set so that the mask M is completely removed by the etching performed in the step of forming the recesses 10b (the step indicated in the left side of FIG. 4C).

The substrate remains warped in a concave shape (that is, protrudes downward) in this step, as indicated in the right side of FIG. 5A. In other words, the warping amount at this time is approximately 25 µm.

Next, as indicated in the left side of FIG. 5B, silicon oxynitride (SiON) is deposited in the recesses 10b by performing, for example, plasma-enhanced chemical vapor deposition ("PECVD" hereinafter) using a source gas such as $SiH_4$, $N_2O$, $NH_3$, or the like. A lens layer 13a including the microlenses 14 configured of SiON is formed as a result of this step.

Here, changing the ratio of $N_2O$ to $NH_3$ used as the source gas makes it possible to adjust the refractive index of the microlenses 14. This in turn makes it possible to achieve a focal position suited to the pixel size, TFT shape, and F value of the projection lens.

For example, assume that a flow ratio between $N_2O$ and $NH_3$ (that is, the flow rate of $N_2O$:the flow rate of $NH_3$) is 1:1. Note that the flow ratio is not limited thereto and can be set as desired, using only $N_2O$, using only $NH_3$, or the like. Note also that varying the flow ratio will have almost no influence on the warping in the substrate.

It is desirable for the thickness of the lens layer 13a (a distance from the upper surface of the film 12 to the upper surface of the lens layer 13a) to be 5 µm to 20 µm. In this embodiment, the lens layer 13a is approximately 8 µm thick. Note that a set plate temperature for setting the substrate 10 is set to 150° C. to 370° C. The thickness of the lens layer 13a that is layered in this step is controlled by the depth of the recesses 10b, so that the upper surface of the lens layer 13a (and more specifically, the lowest area of the upper surface of the lens layer 13a) is positioned higher than the upper surface of the substrate 10.

Figure 5B:
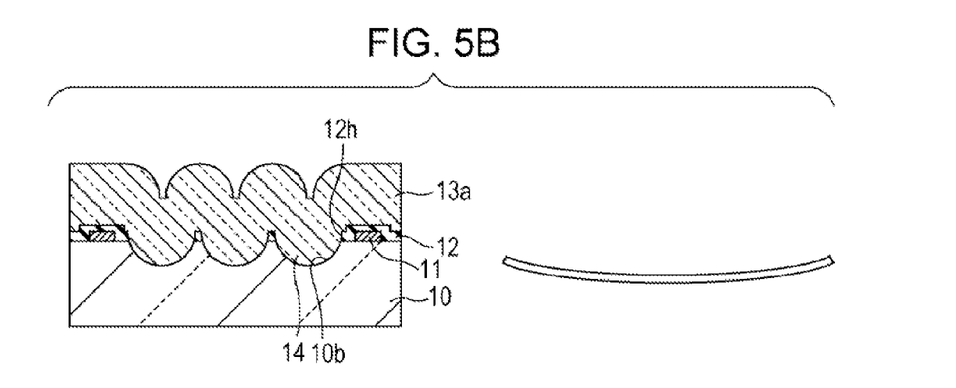

Although the substrate remains warped in a concave shape (that is, protrudes downward) in this step, as indicated in the right side of FIG. 5B, the amount of warping in the substrate changes slightly as a result of the lens layer 13a being formed. The warping amount at this time is approximately 15 μm. In other words, the lens layer 13a functions as a film that receives compressive stress in a direction orthogonal to the normal direction of the substrate 10. The film that receives compressive stress in the direction orthogonal to the normal direction of the substrate 10 will be described in detail later.

As indicated in the left side of FIG. 5B, when the lens layer 13a is formed through PECVD on the substrate 10 that has the recesses 10b, the layer is formed having a shape in which the respective hemispheres are shifted from each other by half a unit of pitch.

Accordingly, an upper area of the lens layer 13a is then smoothed using, for example, chemical mechanical polishing ("CMP" hereinafter), as indicated in the left side of FIG. 5C. The lens layer 13, whose upper surface has been smoothed, is formed as a result. The thickness of the lens layer 13 (a distance from the upper surface of the film 12 to an upper surface of the lens layer 13) is approximately 3 μm, for example.

Figure 5C:
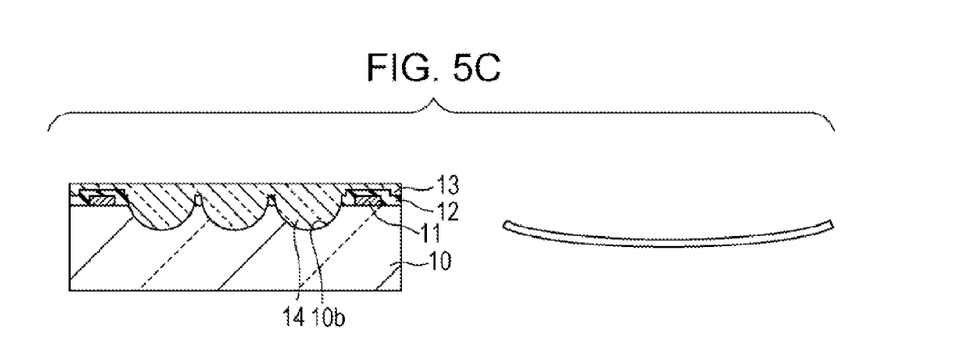

The substrate remains warped in a concave shape (that is, protrudes downward) in this step, as indicated in the right side of FIG. 5C. In other words, the warping amount at this time is approximately 15 μm.

Note that it is preferable to remove an outer peripheral area of the lens layer 13a through dry etching prior to smoothing the upper area of the lens layer 13a through CMP. Doing so makes it possible to suppress steps from being produced between microlens areas (areas where the recesses 10b that form the microlenses 14 are formed) and flat areas (areas where the recesses 10b are not formed) when smoothing the upper area of the lens layer 13a through CMP.

Next, the optical path length adjusting layer 15 is formed upon the lens layer 13. The step of forming the optical path length adjusting layer 15 includes steps of layering, in an alternating manner, the first film 16 that receives the compressive stress in the direction orthogonal to the normal direction of the substrate 10 and the second film 17 that receives tensile stress in the direction orthogonal to the normal direction of the substrate 10. In the step of forming the optical path length adjusting layer 15, the first film 16 is first formed upon the lens layer 13 so that the substrate 10 warps in a direction that cancels out the warping that occurred in the substrate 10 as a result of the annealing.

Here, "receiving the compressive stress in the direction orthogonal to the normal direction of the substrate 10" refers to a compressive force acting on the first film 16 in the direction orthogonal to the normal direction of the substrate 10 due to the substrate 10 attempting to return to its original flat state (a restorative force of the substrate 10). In other words, this refers to a force that pushes extendingly the substrate 10 outward acting on the first film 16.

"Receiving the tensile stress in the direction orthogonal to the normal direction of the substrate 10", meanwhile, refers to an extending force acting on the second film 17 in the direction orthogonal to the normal direction of the substrate 10 due to the restorative force of the substrate 10. In other words, this refers to a force that pulls back the substrate 10 inward acting on the second film 17.

In this embodiment, the following steps are employed in the step for forming the optical path length adjusting layer 15.

Figure 6A:
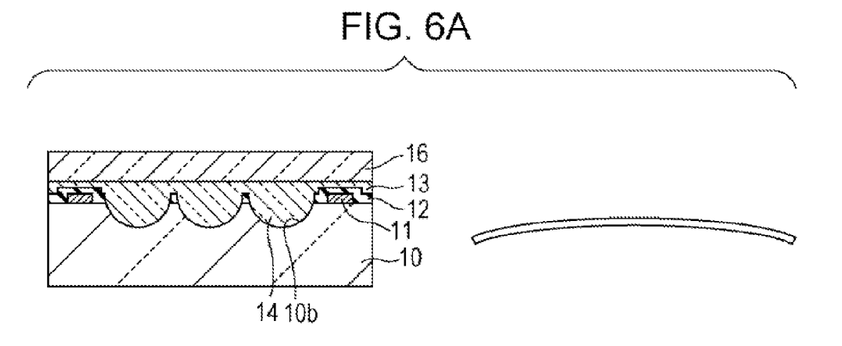
FIGS. 6A through 6C are schematic diagrams illustrating steps for fabricating a microlens array substrate and warping in the substrate.

First, as indicated in the left side of FIG. 6A, the first film 16 is formed upon the lens layer 13 from $SiO_2$ under predetermined plasma conditions through, for example, PECVD using a source gas such as $SiH_4$, $N_2O$, or the like.

A high-frequency plasma source and a low-frequency plasma source are employed when forming the first film 16. This is because the warping in the substrate can change as a result. Specifically, the first film 16 becomes finer when a low-frequency plasma source is employed, and the first film 16 receives the compressive stress in the direction orthogonal to the normal direction of the substrate 10.

For the plasma conditions, a ratio between the frequency of the high-frequency plasma source and the frequency of the low-frequency plasma source (high-frequency plasma source frequency:low-frequency plasma source frequency) is set to 2:1, for example.

In this embodiment, the high-frequency plasma source frequency is assumed to be 13.56 MHz and the low-frequency plasma source frequency is assumed to be 300 kHz. The high-frequency plasma source frequency and the low-frequency plasma source frequency are not, however, limited to these frequencies, and can be set as desired. Warping in the substrate can be changed by changing the ratio between the high-frequency plasma source frequency and the low-frequency plasma source frequency.

In this embodiment, the first film 16 is approximately 4 μm thick. Note however that the thickness of the first film 16 is not limited thereto and can be set as desired. Varying the thickness of the first film 16 makes it possible to change the warping in the substrate.

The substrate is warped in a convex shape (that is, protrudes upward) in this step due to the effect of the first film 16, as indicated in the right side of FIG. 6A. In other words, the direction of the warp produced in the substrate by the annealing is the reverse of the direction of the warp produced in the substrate by the effect of the first film 16. The warping amount at this time is approximately 20 μm.

Figure 6B:
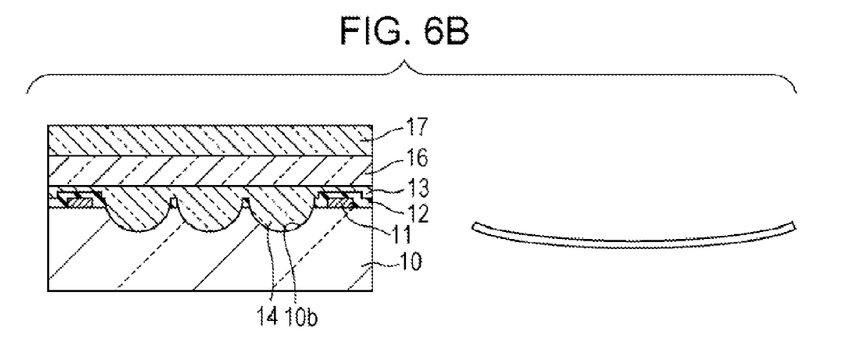

Next, as indicated in the left side of FIG. 6B, the second film 17 is formed upon the first film 16 from $SiO_2$ under predetermined plasma conditions through, for example, PECVD using a source gas such as $SiH_4$, $N_2O$, or the like.

A high-frequency plasma source is employed when forming the second film 17. This is because the warping in the substrate can change as a result. Specifically, the second film 17 receives the tensile stress in the direction orthogonal to the normal direction of the substrate 10 when a high-frequency plasma source is employed.

For the plasma conditions, a ratio between the frequency of the high-frequency plasma source used when forming the first film 16 and the frequency of the high-frequency plasma source used when forming the second film 17 (high-frequency plasma source frequency when forming first film 16:high-frequency plasma source frequency when forming second film 17) is set to 2:3, for example.

In this embodiment, the second film 17 is approximately 3 μm thick. Note however that the thickness of the second film 17 is not limited thereto and can be set as desired. Varying the thickness of the second film 17 makes it possible to change the warping in the substrate.

The substrate is warped in a concave shape (that is, protrudes downward) in this step due to the effect of the second film 17, as indicated in the right side of FIG. 6B. In other words, the direction of the warp produced in the substrate due to the effect of the first film 16 is the reverse of the direction of the warp produced in the substrate by the effect of the second film 17. The warping amount at this time is approximately 5 μm.

Figure 6C:
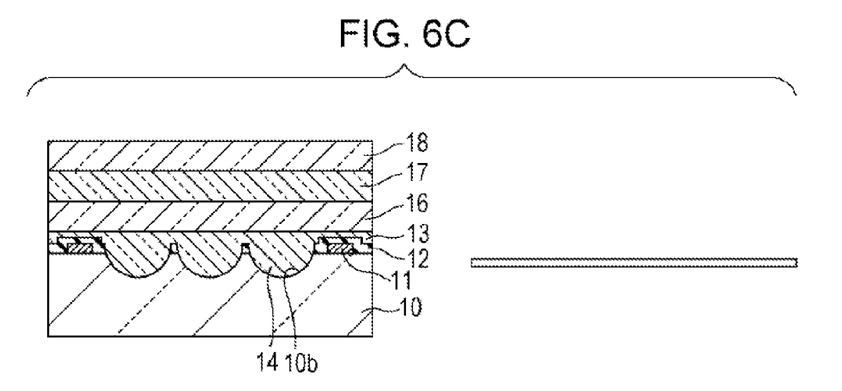

Next, as indicated in the left side of FIG. 6C, the third film 18 is formed upon the second film 17 from $SiO_2$ under predetermined plasma conditions through, for example, PECVD using a source gas such as $SiH_4$, $N_2O$, or the like. The optical path length adjusting layer 15 is completed as a result.

As in the step of forming the first film 16, a high-frequency plasma source and a low-frequency plasma source are employed when forming the third film 18. Accordingly, the third film 18 receives the compressive stress in the direction orthogonal to the normal direction of the substrate 10.

For the plasma conditions, a ratio between the frequency of the high-frequency plasma source and the frequency of the low-frequency plasma source (high-frequency plasma source frequency:low-frequency plasma source frequency) is set to 2:1, for example.

The high-frequency plasma source frequency and the low-frequency plasma source frequency are not, however, limited to these frequencies, and can be set as desired. Warping in the substrate can be changed by changing the ratio between the high-frequency plasma source frequency and the low-frequency plasma source frequency.

In this embodiment, the third film 18 is approximately 4 μm thick. Note however that the thickness of the third film 18 is not limited thereto and can be set as desired. Varying the thickness of the third film 18 makes it possible to change the warping in the substrate.

The substrate returns to its original flat shape in this step due to the effect of the third film 18, as indicated in the right side of FIG. 6C. In other words, the warping is eliminated from the substrate.

Although this embodiment has described forming three layers in the step of forming the optical path length adjusting layer 15, namely the first film 16, the second film 17, and the third film 18, it should be noted that the configuration is not limited thereto.

For example, the configuration may be such that two layers are formed, namely the first film 16 and the second film 17. Alternatively, the configuration may be such that a film that receives the compressive stress in the direction orthogonal to the normal direction of the substrate 10 (this corresponds to a first film) and a film that receives the tensile stress in the direction orthogonal to the normal direction of the substrate 10 (this corresponds to a second film) are layered in an alternating manner to form four or more layers.

In terms of improving production efficiency, however, it is preferable to have a low number of layers (a low number of depositions).

Although this embodiment gives an example of a configuration in which the substrate 10 is a silica substrate and the oxide film 12 is a silicon oxide film, and the first film 16 is selected as the first film to be formed upon the lens layer 13 in the step of forming the optical path length adjusting layer 15, the invention is not limited thereto. In the step of forming the optical path length adjusting layer 15, a film that exerts a stress for warping the substrate in a direction that cancels out the warping in the substrate caused by the annealing may be selected from among the first film 16 and the second film 17, and that film may then be formed upon the lens layer 13 first.

In other words, of the film that receives the compressive stress in the direction orthogonal to the normal direction of the substrate 10 and the film that receives the tensile stress in the direction orthogonal to the normal direction of the substrate 10, one film that exerts a stress for warping the substrate in a direction that cancels out the warping in the substrate caused by the annealing is formed as the lowermost layer of the optical path length adjusting layer 15, and the other film is then formed on top of the one film. The one film and the other film may then be formed in an alternating manner upon the first instance of the other film.

Here, forming a thick optical path length adjusting layer 15 can roughen the surface of the layer and cause clouding. Accordingly, the upper area of the optical path length adjusting layer 15 (the third film 18) is smoothed through CMP, for example. The optical path length adjusting layer 15, whose upper surface has been smoothed, is formed as a result. The amount of grinding of the optical path length adjusting layer 15 is no more than 1 μm, for example.

Figure 7A:
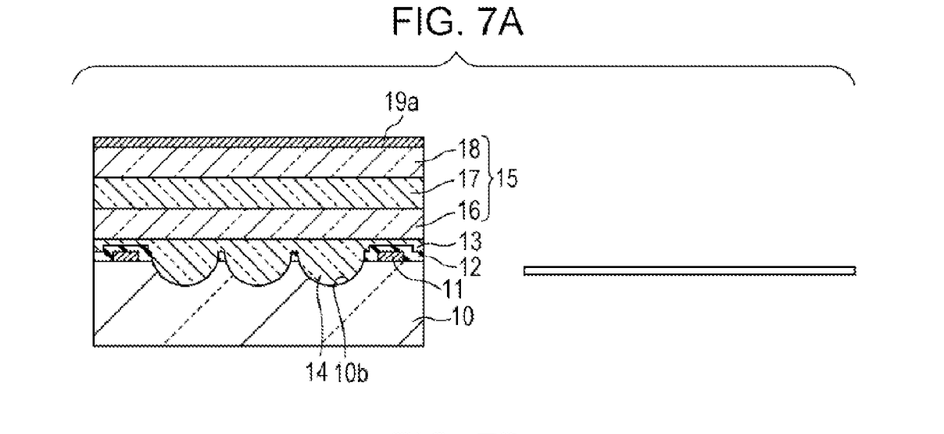
FIGS. 7A through 7C are schematic diagrams illustrating steps for fabricating a microlens array substrate and warping in the substrate.

Next, a film 19a configured of aluminum (Al) is formed upon the optical path length adjusting layer 15 (the third film 18) through sputtering, for example, as indicated in the left side of FIG. 7A. The film 19a is approximately 1500 Å thick, for example.

Figure 7B:
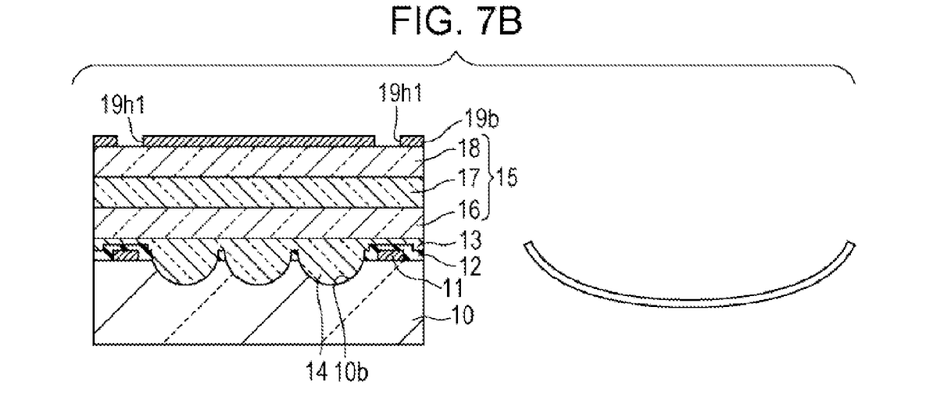

The substrate is not warped in this step, as indicated in the right side of FIG. 7B.

Next, as indicated in the left side of FIG. 7B, the film 19a is removed from regions in locations corresponding to the marks 11 (that is, regions that overlap with the marks 11 when viewed from above) so as to excavate openings 19h1, by patterning the film 19a using photolithography and etching. A film 19b, which has the openings 19h1 that serve as windows for viewing the marks 11, is formed as a result.

After this, a resist mask (not shown) used for the patterning is removed at an atmospheric temperature of approximately 250° C. through etching using a chlorine etchant or the like.

The substrate is warped in a concave shape (that is, protrudes downward) in this step, as indicated in the right side of FIG. 7B. The warping amount at this time is approximately 80 μm. The film 19a contracting due to the atmospheric temperature when removing the resist mask can be thought of as a reason for the substrate warping in this manner.

Figure 7C:
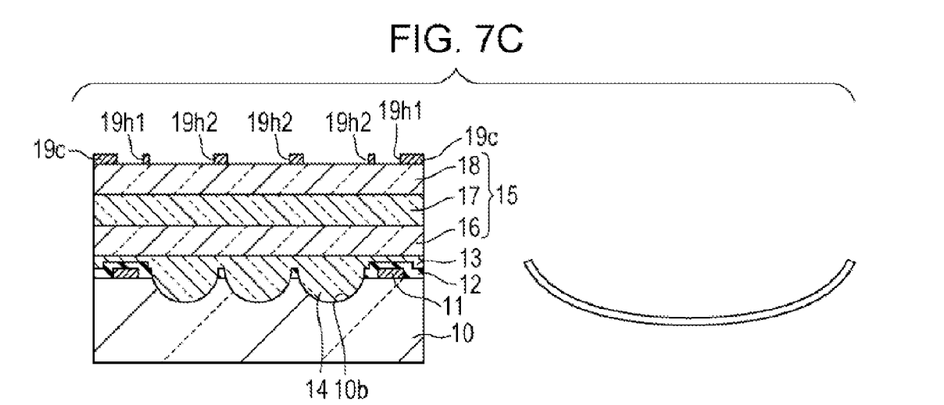

Next, as indicated in the left side of FIG. 7C, the film 19b is removed from regions corresponding to the aperture regions of the respective pixels (that is, regions that overlap with the aperture regions when viewed from above) so as to excavate openings 19h2, by patterning the film 19b using photolithography and etching. The light-blocking film 19 that has the openings 19h1 and the openings 19h2 is formed as a result.

Note that films 19c located on both ends of the light-blocking film 19 function as alignment marks for positioning the element substrate and the opposing substrate when affixing those substrates to each other.

Figure 8A:
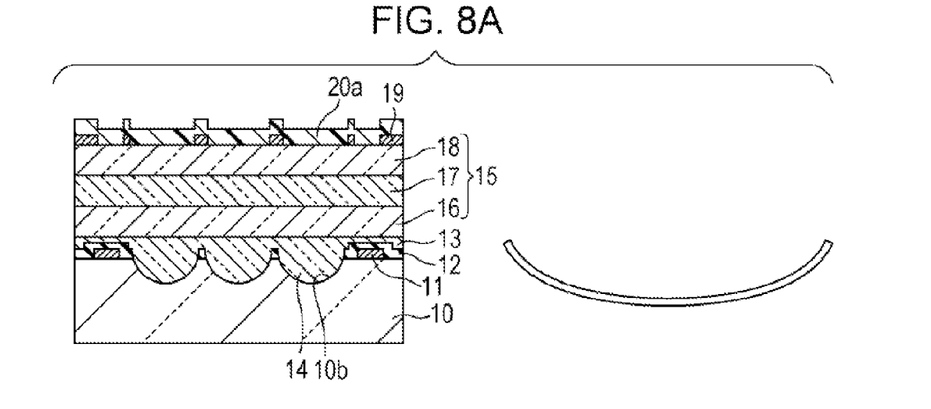
FIGS. 8A through 8C are schematic diagrams illustrating steps for fabricating a microlens array substrate and warping in the substrate.

Next, as indicated in the left side of FIG. 8A, a film 20a is formed from $SiO_2$ under predetermined plasma conditions through, for example, PECVD using a source gas such as $SiH_4$, $N_2O$, or the like, so as to cover the light-blocking film 19 on the optical path length adjusting layer 15 (the third film 18).

As in the step of forming the first film 16, a high-frequency plasma source and a low-frequency plasma source are employed when forming the film 20a.

For the plasma conditions, a ratio between the frequency of the high-frequency plasma source and the frequency of the low-frequency plasma source (high-frequency plasma source frequency:low-frequency plasma source frequency) is set to 2:1, for example.

The high-frequency plasma source frequency and the low-frequency plasma source frequency are not, however, limited to these frequencies, and can be set as desired. Warping in the substrate can be changed by changing the ratio between the high-frequency plasma source frequency and the low-frequency plasma source frequency.

In this embodiment, the thickness of the film 20a (a distance from the upper surface of the light-blocking film 19 to the upper surface of the film 20a) is approximately 2 μm. Note however that the thickness of the film 20a is not limited thereto, and can be set as desired. Varying the thickness of the film 20a makes it possible to change the warping in the substrate.

Although the substrate remains warped in a concave shape (that is, protrudes downward) in this step, as indicated in the right side of FIG. 8A, the amount of warping in the substrate changes slightly as a result of the film 20a being formed. The warping amount at this time is approximately 70 μm. In other words, the film 20a functions as a film that receives the compressive stress in a direction orthogonal to the normal direction of the substrate 10.

When the film 20a is formed through PECVD so as to cover the light-blocking film 19 on the optical path length adjusting layer 15 (the third film 18) as indicated in the left side of FIG. 8A, the film 20a is formed in a shape conforming to areas where the light-blocking film 19 is formed and areas where the light-blocking film 19 is not formed (that is, the openings 19h1 and 19h2).

Figure 8B:
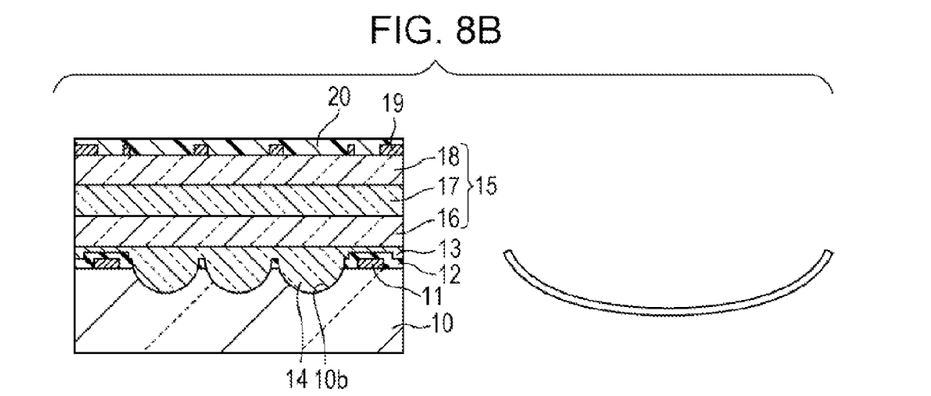

Accordingly, an upper area of the film 20a is then smoothed through CMP, for example, as indicated in the left side of FIG. 8B. The flattening film 20, whose upper surface has been smoothed, is formed as a result. The thickness of the flattening film 20 (a distance from the upper surface of the light-blocking film 19 to the upper surface of the flattening film 20) is approximately 1 μm, for example.

The substrate remains warped in a concave shape (that is, protrudes downward) in this step, as indicated in the right side of FIG. 8B. In other words, the warping amount at this time is approximately 70 μm.

Next, the transparent conductive film 21 is formed from indium tin oxide ("ITO" hereinafter) upon the flattening film 20 through sputtering or the like, as indicated in the left side of FIG. 8C. The transparent conductive film 21 is approximately 1,460 Å thick, for example.

Figure 8C:
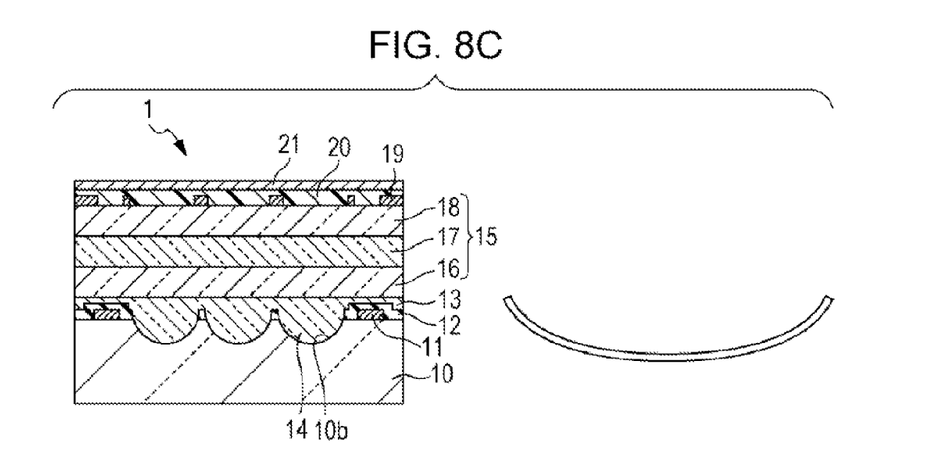

The substrate remains warped in a concave shape (that is, protrudes downward) in this step, as indicated in the right side of FIG. 8C. In other words, the warping amount at this time is approximately 70 μm.

The microlens array substrate 1 according to this embodiment of the invention is completed through the steps described thus far.

According to the method for fabricating the microlens array substrate 1 according to this embodiment, the first film 16 that receives the compressive stress in the direction orthogonal to the normal direction of the substrate 10 is first formed upon the lens layer 13 in the step of forming the optical path length adjusting layer 15, and thus stress produced in the substrate by the annealing can be alleviated in the initial stage of forming the optical path length adjusting layer 15.

In, for example, the case where the second film 17 that receives the tensile stress in the direction orthogonal to the normal direction of the substrate 10 is formed on the lens layer 13 first, the second film 17 will act on the substrate in a direction that increases the warping in the substrate caused by the annealing. As a result, the substrate warps extensively in the initial stage of forming the optical path length adjusting layer 15, which makes it difficult to correct the warping in the substrate later. However, the method according to this embodiment forms the first film 16 on the lens layer 13 first, and thus the stated problem does not occur.

In addition, because the first film 16 and the second film 17 are layered in an alternating manner, the warping in the substrate can be corrected while adjusting the amount of stress to be alleviated in the substrate by adjusting formation conditions such as the thicknesses, materials, and so on of the first film 16 and the second film 17.

Accordingly, the substrate can be suppressed from warping.

With the microlens array substrate 1 according to this embodiment, the substrate remains warped in a concave shape (that is, protrudes downward), as indicated in the right side of FIG. 8C. This is to conform to warping in the element substrate to which the opposing substrate is to be affixed.

As long as the warping amount in the substrate is no greater than 100 μm, the warping will have no effect on the process for affixing the element substrate and the opposing substrate to each other, or in other words, it will not be difficult to position the element substrate and the opposing substrate when affixing those substrates to each other. In this embodiment, the warping amount in the substrate is approximately 70 μm, which is lower than the stated 100 μm, and thus the element substrate and the opposing substrate can be positioned with ease when affixing the substrates to each other.

This embodiment describes an example in which the microlens array substrate 1 is fabricated by forming the lens layer 13 configured of the plurality of microlenses 14 by depositing a lens material on the substrate 10 in which is formed the plurality of recesses 10b corresponding to the plurality of microlenses 14 so as to form the plurality of microlenses 14, forming the optical path length adjusting layer 15 upon the lens layer 13, and furthermore forming the light-blocking film 19, the flattening film 20, and the transparent conductive film 21, in that order, upon the optical path length adjusting layer 15. However, the invention is not limited thereto.

For example, the microlens array substrate may be configured without the light-blocking film 19, the flattening film 20, and the transparent conductive film 21. Variation Next, a fabrication method for a microlens array substrate 2 according to a variation of the invention will be described with reference to FIGS. 10A through 10C.

Figure 10A:
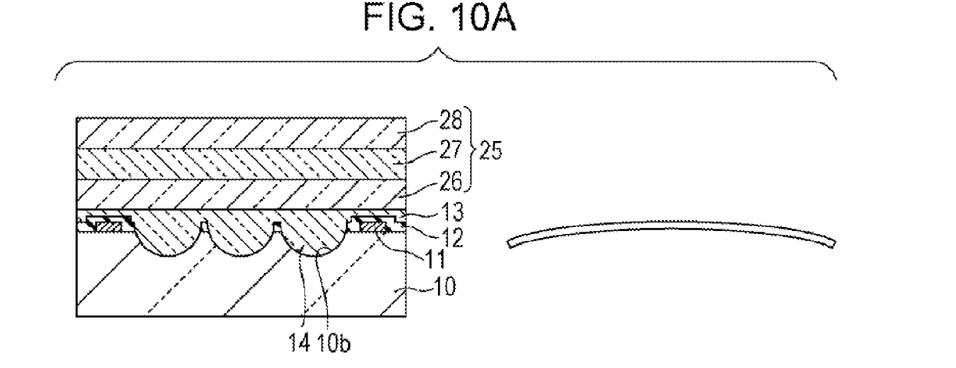
FIGS. 10A through 10C are schematic diagrams illustrating steps for fabricating a microlens array substrate and warping in the substrate, according to a variation on the invention.
Figure 10B:
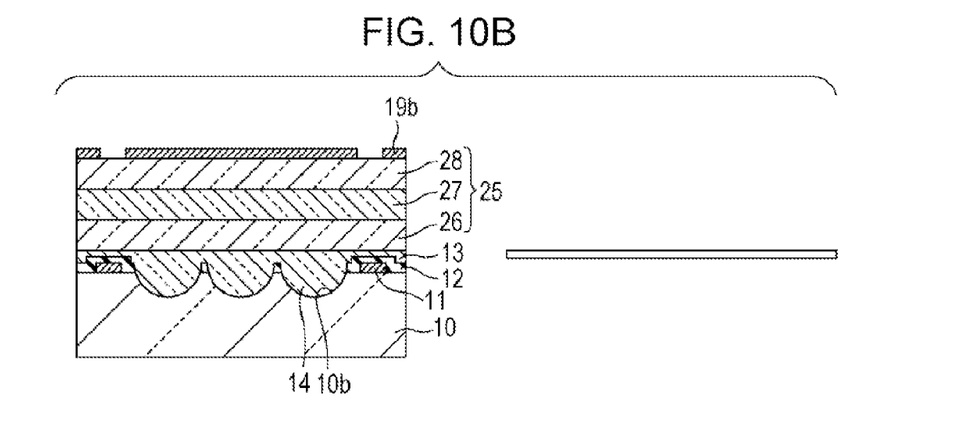
Figure 10C:
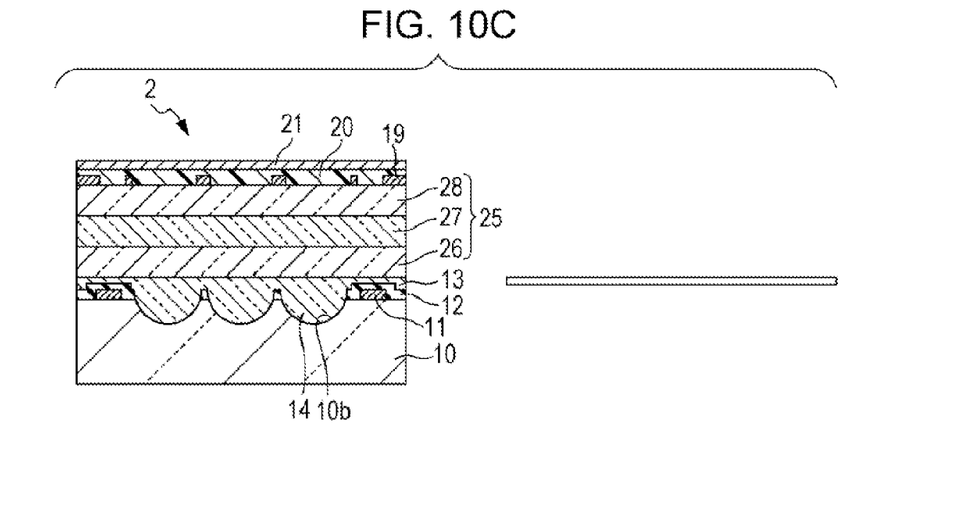

FIGS. 10A through 10C are schematic diagrams illustrating steps for fabricating the microlens array substrate and warping in the substrate.

Note that in FIGS. 10A through 10C, the left sides are diagrams illustrating steps for fabricating the microlens array substrate as cross-sectional views, and the right sides indicate the state of warping in the substrate. Note also that in FIGS. 10A through 10C, steps identical to those in the aforementioned embodiment are not shown, and descriptions thereof will be omitted.

In a step of forming an optical path length adjusting layer 25 according to this variation, the substrate is caused to warp in a direction that cancels out warping in the substrate occurring in the steps that follow the step of forming the optical path length adjusting layer 25.

In this variation, the following steps are employed in the step for forming the optical path length adjusting layer 25.

First, as indicated in the left side of FIG. 10A, a first film 26, a second film 27, and a third film 28 are formed upon the lens layer 13 from $SiO_2$ under predetermined plasma conditions through, for example, PECVD using a source gas such as $SiH_4$, $N_2O$, or the like. The optical path length adjusting layer 25 is formed upon the lens layer 13 as a result.

In this variation, the substrate is warped in a convex shape (that is, protrudes upward) as indicated in the right side of FIG. 10A, by varying the frequency of the plasma source, the thicknesses, and so on as desired while forming the first film 26, the second film 27, and the third film 28. In other words, the optical path length adjusting layer 25 has an effect of warping the substrate in the opposite direction as the direction of warping produced in the substrate in the subsequent steps.

Next, as indicated in the left side of FIG. 10B, the film 19a is removed from regions in locations corresponding to the marks 11 (that is, regions that overlap with the marks 11 when viewed from above) so as to excavate the openings 19h1, by patterning the film 19a using photolithography and etching. The film 19b, which has the openings 19h1 that serve as windows for viewing the marks 11, is formed as a result.

After this, a resist mask (not shown) used for the patterning is removed at an atmospheric temperature of approximately 250° C. through etching using a chlorine etchant or the like.

The substrate returns to its original flat shape in this step due to the effect of the atmospheric temperature when removing the resist mask, as indicated in the right side of FIG. 10B. In other words, the warping is eliminated from the substrate.

The microlens array substrate 2 according to this variation is then completed by carrying out the steps of forming the light-blocking film 19, the flattening film 20, and the transparent conductive film 21, as indicated in the left side of FIG. 10C.

According to the microlens array substrate 2 fabrication method in this variation, the substrate can, in the step of forming the optical path length adjusting layer 25, be pre-warped in a direction that alleviates stress produced in the substrate in a later step (the step of forming the film 19b). Accordingly, the microlens array substrate 2 that is ultimately fabricated can be prevented from warping.

Although this variation describes an example in which the later step is the step of forming the film 19b that serves as the light-blocking film 19, and in which in the step of forming the optical path length adjusting layer 25 the substrate is caused to warp in a direction that cancels out warping produced in the step of forming the film 19b, the invention is not limited thereto. As long as there is another later step that produces warping in the substrate after the step of forming the optical path length adjusting layer 25, the substrate may, when the optical path length adjusting layer 25 is formed, be pre-warped in a direction that cancels out the warping produced in that later step.

Electronic Device

Figure 11:
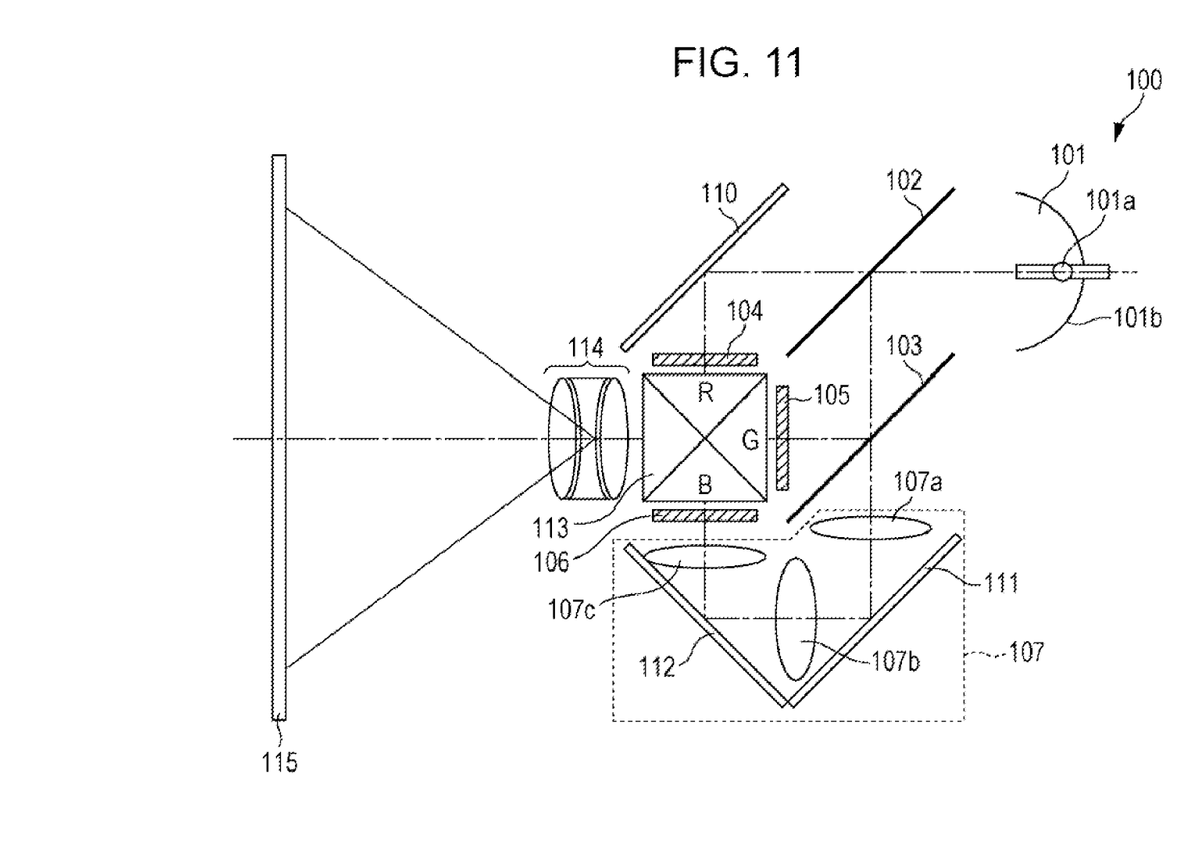
FIG. 11 is a diagram illustrating the overall configuration of a projector.

The aforementioned microlens array substrate is used as an opposing substrate that partially configures an optical modulation apparatus in a projector 100 such as that shown in FIG. 11.

FIG. 11 is a diagram illustrating the overall configuration of a projector.

As shown in FIG. 11, the projector 100 includes a light source 101, dichroic mirrors 102 and 103, a red light optical modulation apparatus 104, a green light optical modulation apparatus 105, a blue light optical modulation apparatus 106, a light guiding optical system 107, reflecting mirrors 110 to 112, a cross dichroic prism 113, and a projection lens 114. Color image light emitted from the projector 100 is projected onto a screen 115.

The light source 101 includes a lamp 101a such as a metal halide lamp and a reflector 101b that reflects light from the lamp 101a.

The dichroic mirror 102 is configured to allow red light from the white light emitted by the light source 101 to pass while reflecting green light and blue light. The dichroic mirror 103 is configured to allow blue light from the blue light and green light reflected by the dichroic mirror 102 to pass through while reflecting green light.

The red light optical modulation apparatus 104, the green light optical modulation apparatus 105, and the blue light optical modulation apparatus 106 include the aforementioned microlens array substrate as their opposing substrates.

The red light optical modulation apparatus 104 is configured to modulate, based on a predetermined image signal, red light that has passed through the dichroic mirror 102 and is incident on the red light optical modulation apparatus 104.

The green light optical modulation apparatus 105 is configured to modulate, based on a predetermined image signal, green light that has been reflected by the dichroic mirror 103 and is incident on the green light optical modulation apparatus 105.

The blue light optical modulation apparatus 106 is configured to modulate, based on a predetermined image signal, blue light that has passed through the dichroic mirror 103 and is incident on the blue light optical modulation apparatus 106.

The light guiding optical system 107 is configured of an incoming lens 107a, a relay lens 107b, and an outgoing lens 107c, and is provided to suppress optical loss caused by the length of the optical path for the blue light.

The reflecting mirror 110 is configured to reflect the red light that has passed through the dichroic mirror 102 toward the red light optical modulation apparatus 104.

The reflecting mirror 111 is configured to reflect the blue light that has passed through the dichroic mirror 103 and the incoming lens 107a toward the relay lens 107b.

The reflecting mirror 112 is configured to reflect the blue light emitted from the relay lens 107b toward the outgoing lens 107c.

The cross dichroic prism 113 is configured by affixing four right-angle prisms to each other; a dielectric multilayer film that reflects red light and a dielectric multilayer film that reflects blue light are formed in an X shape at the borders between the right-angle prisms. The three colors of light are combined by these dielectric multilayer films, forming light that expresses a color image.

The projection lens 114 is configured to enlarge the color image produced by the cross dichroic prism 113 and project the enlarged image onto the screen 115.

Although a preferable exemplary embodiment of the invention has been described thus far with reference to the drawings, it goes without saying that the invention is not intended to be limited to the aforementioned embodiment. The forms, combinations, and so on of the various constituent elements described in the aforementioned embodiment are merely examples, and many variations based on design requirements and the like are possible without departing from the essential spirit of the invention.

Likewise, the specific details of the shapes, numbers, locations, materials, formation methods, and so on of the constituent elements in the microlens array substrate are not intended to be limited to the aforementioned embodiment, and can be changed as desired.

The entire disclosure of Japanese Patent Application No. 2012-237561, filed Oct. 29, 2012 is expressly incorporated by reference herein.

What is claimed is:

1. A fabrication method for a microlens array substrate, the method comprising:
forming an oxide film on a substrate;
annealing the substrate on which the oxide film has been formed;
forming, on the oxide film, a mask having an opening in a location corresponding to the center of a microlens that is to be formed;

forming an aspheric surfaced recess having tapered edges in the substrate on which the oxide film has been formed by wet-etching the oxide film and the substrate through the opening in the mask;

forming the microlens having a convex surface side, and a flat surface side opposite the convex surface side, by depositing a material having a higher refractive index than the substrate in the recess; and forming an optical path length adjusting layer on the flat surface side of the microlens, wherein the forming of the optical path length adjusting layer includes depositing on the flat surface side of the microlens a first film that receives compressive stress in a direction orthogonal to a normal direction of the substrate, a second film that receives tensile stress in the direction orthogonal to the normal direction of the substrate, and a third film that receives compressive stress in a direction orthogonal to a normal direction of the substrate; and the forming of the optical path length adjusting layer includes forming a film that exerts a stress that warps the substrate in a direction that cancels out warping produced in the substrate by the annealing and is selected from among the first film, the second film, and the third film, and the film that has been selected is formed on the microlens first.

2. The fabrication method for the microlens array substrate according to claim 1, wherein the substrate is a silica substrate and the oxide film is a silicon oxide film; and in the forming of the optical path length adjusting layer, the first film is selected as the film that is formed on the microlens first.

3. The fabrication method for the microlens array substrate according to claim 2, wherein the annealing is performed at no less than 800° C. and no more than 1100° C.

4. The fabrication method for the microlens array substrate according to claim 1, wherein in the forming of the optical path length adjusting layer, the substrate is caused to warp in a direction that cancels out warping in the substrate caused by a later process performed after the forming of the optical path length adjusting layer.

5. The fabrication method for the microlens array substrate according to claim 4, wherein the later process is forming of a light-blocking film on the optical path length adjusting layer; and in the forming of the optical path length adjusting layer, the substrate is caused to warp in a direction that cancels out warping in substrate caused by the forming of the light-blocking film.

* * * * *